(12) United States Patent
Myoung

(10) Patent No.: US 11,582,525 B2
(45) Date of Patent: Feb. 14, 2023

(54) TV-BASED ORDERING SYSTEM, METHOD FOR ORDERING USING TV-BASED ORDERING SYSTEM AND RECORDING MEDIUM THEREOF

(71) Applicant: SK STOA CO., LTD., Seoul (KR)

(72) Inventor: Dae Ho Myoung, Seoul (KR)

(73) Assignee: SK STOA CO., LTD., Seoul (KR)

( * ) Notice: Subject to any disclaimer, the term of this patent is extended or adjusted under 35 U.S.C. 154(b) by 0 days.

(21) Appl. No.: 17/235,553

(22) Filed: Apr. 20, 2021

(65) Prior Publication Data

US 2021/0329346 A1    Oct. 21, 2021

(30) Foreign Application Priority Data

Apr. 21, 2020 (KR) .................. 10-2020-0048311

(51) Int. Cl.
| | | |
|---|---|---|
| *H04N 21/478* | (2011.01) | |
| *H04N 21/61* | (2011.01) | |
| *H04N 21/6332* | (2011.01) | |
| *H04N 21/239* | (2011.01) | |

(52) U.S. Cl.
CPC ... *H04N 21/47815* (2013.01); *H04N 21/2393* (2013.01); *H04N 21/6131* (2013.01); *H04N 21/6332* (2013.01)

(58) Field of Classification Search
CPC ......... H04N 21/47815; H04N 21/2393; H04N 21/6131; H04N 21/6332
See application file for complete search history.

(56) References Cited

U.S. PATENT DOCUMENTS

| | | | | |
|---|---|---|---|---|
| 2008/0120658 A1* | 5/2008 | Cubillo | .............. | H04N 21/4781 725/91 |
| 2008/0320546 A1* | 12/2008 | Moon | .............. | H04N 21/44008 725/136 |
| 2011/0282906 A1* | 11/2011 | Wong | .................... | G06F 16/784 707/E17.03 |

FOREIGN PATENT DOCUMENTS

| | | |
|---|---|---|
| KR | 1020100123124 | 11/2010 |
| KR | 101635320 | 6/2016 |
| KR | 1020190022068 | 3/2019 |

OTHER PUBLICATIONS

Office Action issued in corresponding Korean Application 1020200048311, dated Feb. 18, 2021.

* cited by examiner

*Primary Examiner* — Yassin Alata
(74) *Attorney, Agent, or Firm* — Burris Law, PLLC

(57) ABSTRACT

A TV-based ordering system, a TV-based ordering method, and a recording medium are provided. The TV-based ordering system includes a content providing server that receives an order request corresponding to an user input from a set-top box, and an ARS server that receives order information corresponding to the order request from the content providing server, and telephonically connects to the user terminal in response to the order information.

16 Claims, 14 Drawing Sheets

PRODUCT VIEWED TOGETHER

AS SK STORE'S SMART SHOPPING GUIDE
CHECK RELATED PRODUCTS CHECKED TOGETHER WITH
THE BROADCAST PRODUCTS IN ONE PLACE

| SKINCARE ESSENTIALS | BOTTLE STERILIZER | TWO WELL-BEING BLENDERS | [SAME DAY DELIVERY] COMFORTABLE CHAIR | XXXX NEW DESIGN OPEN |

CONSULTATION LINE 080-800-1313

TV-BASED ORDERING SYSTEM, METHOD FOR ORDERING USING TV-BASED ORDERING SYSTEM AND RECORDING MEDIUM THEREOF

CROSS-REFERENCE TO RELATED APPLICATION

This application is based on and claims priority under 35 U.S.C. § 119 to Korean Patent Application No. 10-2020-0048311, filed on Apr. 21, 2020, in the Korean Intellectual Property Office, the disclosure of which is incorporated by reference herein in its entirety.

BACKGROUND

1. Field

Embodiments of the present disclosure relate to a TV-based ordering system, a TV-based ordering method, and a recording medium thereof.

2. Description of the Related Art

An Internet Protocol television (IPTV) service provider may provide various services to IPTV service subscribers through a set-top box installed in a designated space such as a home. An example of such an IPTV service provided to subscribers may be a shopping broadcasting service (or commerce broadcasting) provided through a commerce channel. In the case of a commerce business operator producing such a shopping broadcasting service, a certain amount is paid to the IPTV service provider, and a shopping broadcasting service to be broadcast on a channel assigned/scheduled accordingly is organized. When the IPTV service subscriber selects the scheduled channel in the set-top box, the set-top box receives the shopping broadcasting service regularly arranged on the channel and outputs the shopping broadcasting service through the TV connected to the set-top box, so that IPTV service subscribers may use the shopping broadcasting service.

However, currently, for contents serviced in the form of video on demand (VOD), which are not contents serviced in the form of real-time broadcasting among shopping broadcasting services, there may be a lack of additional service functions to increase customer convenience and reliability. In addition, since the platform of the IPTV service to which the customer subscribes may vary, there is a lack of technical support in that commerce operators provide shopping broadcasting services through such various IPTV services.

SUMMARY

Therefore, for commerce contents serviced in the form of video on demand (VOD), the present disclosure provides a system and method that enables customers to automatically order products of commerce content being viewed.

Also, for commerce contents serviced in the form of VOD, embodiments of the present disclosure provide a method for a customer to automatically order a product of the commerce content being viewed and further provide an additional service function for enhancing customer convenience and reliability, technical support suitable for various platforms of IPTV service, and the like.

Additional aspects will be set forth in part in the description which follows and, in part, will be apparent from the description, or may be learned by practice of the presented embodiments of the disclosure.

According to one or more embodiments of the present disclosure, a TV-based ordering system that is connected to a TV and communicates with a set-top box that receives a user input includes: a content providing server configured to receive an order request corresponding to the user input from the set-top box; and an ARS server configured to receive order information corresponding to an order request from the content providing server and connect a phone to a user terminal in response to the order information.

In at least one variant, the TV-based ordering system may communicate with a broadcaster server, wherein the content providing server may control the TV to display a main channel image received from the broadcaster server and an application image corresponding to the first content information received from the content providing server.

In another variant, the content providing server may obtain product information related to the application image and user information related to the set-top box by using an order request, and generate order information based on the obtained information, wherein the ARS server may connect to the user terminal based on the order information.

In further another variant, when receiving phone connection information from the ARS server, the content providing server may transmit second content information to the TV, and transmit the first content information and the second content information to the ARS server, wherein the content providing server may control the TV to display an application image corresponding to the second content information.

According to one or more embodiments of the present disclosure, A TV-based ordering method using a set-top box connected to a TV and receiving a user input, a content providing server, and an ARS server includes: receiving, by the content providing server, an order request corresponding to the user input from the set-top box; and receiving, by the ARS server, order information corresponding to an order request from the content providing server, and connecting a phone call to a user terminal in response to the order information.

In at least one variant, the method may further include controlling, by the content providing server, the TV to display a main channel image received from the broadcaster server and an application image corresponding to the first content information received from the content providing server.

In another variant, the method may further include: obtaining, by the content providing server, product information related to the application image and user information related to the set-top box by using an order request, and generating order information based on the obtained information; and connecting, by the ARS server, to the user terminal based on the order information.

In further another variant, the method may further include: when receiving phone connection information from the ARS server, transmitting, by the content providing server, second content information to the TV, and transmitting the first content information and the second content information to the ARS server; and controlling, by the content providing server, the TV to display an application image corresponding to the second content information.

One or more embodiments of the present disclosure are directed to a computer-readable recording medium in which a program for performing any one of the above methods is recorded.

Other aspects, features, and advantages than those described above will become apparent from the following drawings, claims, and detailed description of the invention.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5 to 7B are diagrams for explaining a TV-based ordering method according to an embodiment of the present disclosure, where:

FIG. 5 illustrates a display of a main channel image corresponding to a user's selection;

FIG. 7B illustrates a display of a guide screen subsequent to the order process shown in FIG. 7A;

FIGS. 8A to 9 are diagrams for explaining providing additional information in a subsequent order process according to an embodiment of the present disclosure, where:

FIG. 8A illustrates a display of selection of additional information in response to an additional information request signal;

FIG. 8B illustrates a display of additional information upon selection by a user as shown in FIG. 8A; and FIG. 9 illustrates a display of another additional information;

DETAILED DESCRIPTION

Figure 1:
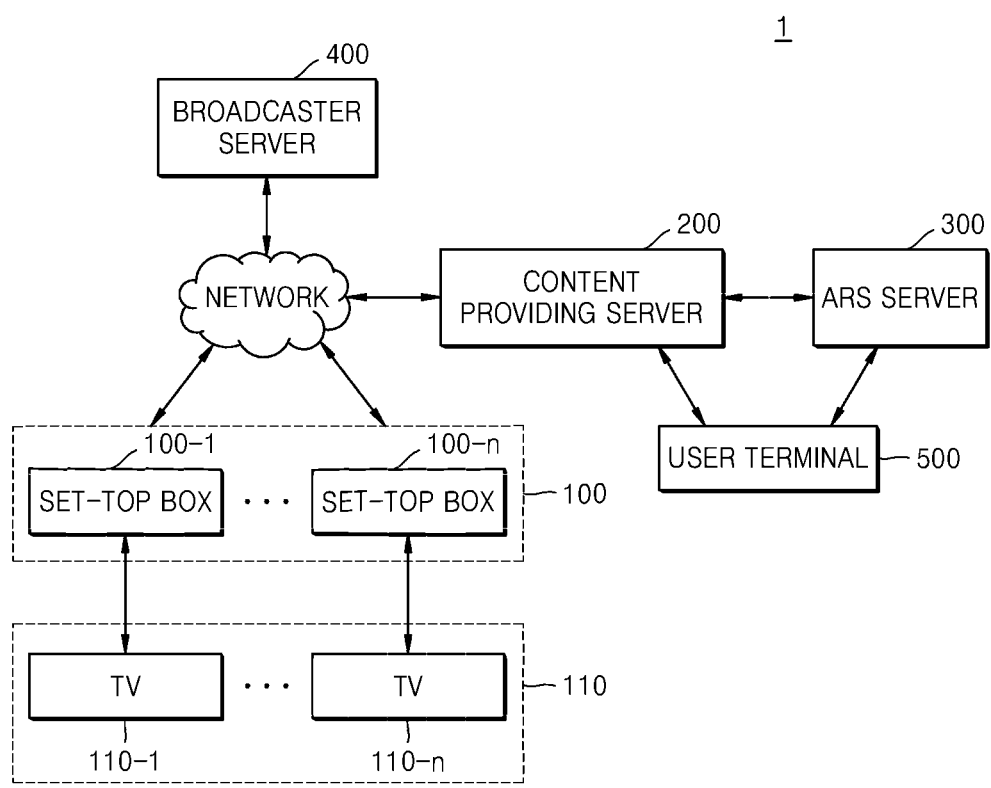
FIG. 1 is a system diagram illustrating a TV-based ordering system according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Since the present disclosure may apply various modifications and have various embodiments, specific embodiments are illustrated with reference to the drawings and will be described in detail. Effects and features of the present disclosure, and a method of achieving them will be apparent with reference to the embodiments described below in detail together with the drawings. However, the present disclosure is not limited to the embodiments disclosed below and may be implemented in various forms.

Hereinafter, embodiments of the present disclosure will be described in detail with reference to the accompanying drawings, and when describing with reference to the drawings, the same or corresponding constituent elements are given the same reference numerals, and redundant descriptions thereof will be omitted.

In the following embodiments, terms such as first and second are not used in a limiting meaning, but for the purpose of distinguishing one component from another component.

In the following examples, the singular expression includes the plural expression unless the context clearly indicates otherwise.

In the following embodiments, terms such as include or have means that the features or elements described in the specification are present, and do not preclude the possibility of adding one or more other features or elements in advance.

The following description refers to the accompanying drawings, which illustrate specific embodiments in which the present disclosure may be implemented. These embodiments are described in detail sufficient to enable a person skilled in the art to practice the present disclosure. It should be understood that the various embodiments of the present disclosure are different from each other, but need not be mutually exclusive.

In addition, it should be understood that the position or arrangement of individual elements in each embodiment may be changed without departing from the spirit and scope of the present disclosure. Accordingly, the detailed description to be described below is not made in a limiting sense, and the scope of the present disclosure should be taken as encompassing the scope claimed by the claims of the claims and all scopes equivalent thereto. Like reference numerals in the drawings indicate the same or similar elements over several aspects.

Hereinafter, various embodiments of the present disclosure will be described in detail with reference to the accompanying drawings in order to enable those of ordinary skill in the art to easily implement the present disclosure.

FIG. 1 is a system diagram illustrating a TV-based ordering system according to an embodiment of the present disclosure.

The TV-based ordering system 1 of the present disclosure may include a content providing server 200 and an Automatic Response System (ARS) server 300. The content providing server 200 may be connected to the broadcaster server 400 through a network.

Referring to FIG. 1, the set-top box 100, the content providing server 200, and the broadcaster server 400 may communicate with each other through the network, and the content providing server 200, the ARS server 300, and the user terminal 500 may also transmit and receive data to and from each other through the network. The communication method of the network of the present disclosure is not limited, but the network according to some embodiments may use short-range wireless communication.

The system diagram of FIG. 1 is only an example of a TV-based ordering system 1 according to an embodiment. In other forms, the TV-based ordering system 1 includes the set-top box 100 and the TV 110 that may be implemented as one piece of hardware. Although not shown in this drawing, the user may communicate with the set-top box 100 and/or the TV 110 through a remote control device (e.g., a remote controller).

The set-top box 100 may be installed in a designated space such as a home to provide IPTV service, and the set-top box 100 receives data on IPTV services such as shopping broadcasting services provided through a commerce channel through the set-top box 100 to provide related images or videos to users.

The set-top box 100 may communicate with the content providing server 200 and the broadcaster server 400 through the network. In some forms, the set-top box 100 may transmit the data received from the content providing server 200 and the broadcaster server 400 to the TV 110 based on the data received.

The set-top box 100 may transmit a user input received through the TV 110 to the content providing server 200. For example, the set-top box 100 may transmit an order request signal to the content providing server 200 in response to a user input.

The TV 110 may communicate with the content providing server 200 and the broadcaster server 400 through the set-top box 100. In other forms, the TV 110 may be implemented as one piece of hardware with the set-top box 100 to perform direct network communication.

The TV 110 may display, through the set-top box 100, a channel image corresponding to the information received from the broadcaster server 400 and an application image corresponding to the information received from the content providing server 200 through the set-top box 100. In addition, the TV 110 may receive a user input through a remote control device such as a remote controller, and transmit a user input signal to the content providing server 200 in response thereto.

The set-top box 100 may include a plurality of set-top boxes 100-1 to 100-n, and the TV 110 may include a plurality of TVs 110-1 to 110-n corresponding to the plurality of set-top boxes 100-1 to 100-n, respectively. Further, the TV 110 includes a smart TV, but this is only an example, and may include all types of electronic devices including a display such as a smart phone and a Portable Media Player (PMP). On the other hand, when the TV 110 is implemented as a portable device, it may have a built-in touch screen and may be implemented to execute a program using a finger or a pen (e.g., a stylus pen). Hereinafter, for convenience of description, it is assumed and described that the TV 110 is implemented as a smart TV.

According to one embodiment, the set-top box 100 may receive a user input requesting an order for a product corresponding to the channel image and application image displayed on the TV 110, and transmit the order request to the content providing server 200.

In some forms, the content providing server 200 may communicate with the set-top box 100 through the network. In addition, the content providing server 200 may communicate with the broadcaster server 400 through the network. The content providing server 200 may transmit content information corresponding to the application image to the set-top box 100.

The content providing server 200 may enable the application image to be run on the TV 110 screen through the set-top box 100 using a cloud service. As an example, the content providing server 200 may run an application stored in a cloud server, and display an image corresponding to such an application on the TV 110 of each user through the set-top box 100.

Specifically, the content providing server 200 may allow the capture information of such content to be displayed on the TV 110 screen through the set-top box 110, instead of the information itself including various contents such as operations through the cloud solution. As such a cloud solution, application execution on the content providing server 200 may be performed in various browsers or various software execution platforms, and for example, may be executed with a Chrome browser.

Accordingly, it is possible to address the user's need for an overload or high-end device in the TV 110 or the set-top box 100.

Additionally or alternatively, while the "main channel image" is displayed on the TV 110 screen through the user's channel selection, the content providing server 200 may be connected to the set-top box 100. When selecting a user's channel, the content providing server 200 transmits image information (e.g., image link information) and/or other various information or functions from the broadcaster server 400 to the set-top box 100, and the set-top box 100 receives data about the image from the broadcaster server 400 using such information, such that the image from the broadcaster server 400 together with the screen information provided from the content providing server 200 may be implemented on the TV 110 screen.

The content providing server 200 may control conversion of a first cloud server (not shown) and a second cloud server (not shown) having different types when implementing application(s) using a cloud server.

For example, the first cloud server may have thousands of users (e.g., 3,000 to 6,000 users) for each open window (application), and may accommodate tens of times more (e.g., 10 to 30 times) than the second cloud server. However, through the first cloud server, each user sees the same image on a TV screen.

The second cloud server may be accessed by a small number of users, for example, one user per one opened window (application), and in this case, approximately hundreds of people (e.g., about 300 people) may be accommodated per server.

Server resources may be consuming because of the constant encoding and capturing of each and every window screen.

The content providing server 200 may implement a screen in the TV 110 by running an application corresponding to the selected channel through the first cloud server, and therefore, the first cloud server may implement a screen on the TVs 110-1 through 110-n of a plurality of users. Then, when a user takes an action, such as manipulating a remote controller, in the case of the set-top box 100 connected to the user's TV 110, the connection may be changed to be connected to the second cloud server. As a result, in the case that users who mainly watch a first screen broadcast change channels without using a remote controller, connection to the second cloud server may be avoided and the efficiency of running an application through the cloud server may be effectively improved for all users.

The content providing server 200 may control a delivery process of one or more pieces of information through application running. For example, information of each of the videos displayed on the user's screen through the application operation, shopping deal information included in the video, sales item information included in the shopping deal, and the execution time and remaining time information when the video is executed, may be handled, and this information may be transmitted to the TV 110 through the set-top box 100 to be displayed in various forms on the TV 110 screen.

In addition, when a user watches the TV 110 screen and performs one or more actions, for example, when there is a selection for UI such as a menu bar selection, a review view selection, an order selection, or a banner area (e.g., the right banner window), the content providing server 200 may receive from the set-top box 100 the notification that such a selection has been made, and may use or store the related information, or transmit the related information to a management server through a network.

In addition, the content providing server 200 may transmit information on a main channel image and/or an application image displayed on the TV 110 screen to the ARS server 300 through the set-top box 100.

Additionally, or alternatively, upon receiving an order request from the set-top box 100, the content providing server 200 may generate order information corresponding to the received order request, and may transmit the order information to the ARS server 300.

Specifically, the order information may include information on the number of simultaneous viewing and access of the set-top box 100 for the ordered product, inventory information for the ordered product, time stamp information, product information, and user information (e.g., registered user phone number).

Upon receiving order information from the content providing server 200, the ARS server 300 according to an embodiment of the present disclosure may perform a telephone connection to a user corresponding to the received order information. In this case, the telephone connection may be automatically performed through an Interactive Voice Response (IVR) system included in the ARS server 300, but is not limited thereto.

Additionally or alternatively, the ARS server 300 may perform an order process of a user based on not only order information, but also additional information. For example, the ARS server 300 may identify an image that the user is viewing at a time when a user input is received based on the information included in first content information and second content information (e.g., set-top box information, media information, and layer information). For example, the set-top box information may include ID information of the set-top box 100, user payment information, user delivery information, user's past purchase history information, and user phone number, and the media information may include an image media information corresponding to the order request, promotion information on a product corresponding to the order request. And, for example, the layer information may include an image layer information in which a user command corresponding to the order is input. This will be described further later.

According to the above-described embodiment, the ARS server 300 has an effect that it is possible to easily place an order by identifying an image and various information that the user is watching when placing an order, without additional interaction with the user.

The broadcaster server 400 may transmit the main channel image to the set-top box 100 via the network, which in turn transmits the main channel image to the TV 110 connected to the set-top box 100. Channel images transmitted from the broadcaster server 400 to each set-top box 100 may be independent. That is, the channel image transmitted from the broadcaster server 400 to the set-top box 100 connected to the TV 110 may be different from the channel image transmitted from the broadcaster server 400 to another set-top box 100. Of course, in some cases, the channel image transmitted from the broadcaster server 400 to one set-top box 100 may be the same or similar to the channel image transmitted from the broadcaster server 400 to another set-top box 100.

The user terminal 500 may be an electronic device that provides information input from a user of the set-top box 100 and the TV 110 connected thereto. The user terminal 500 may be implemented as a portable device such as a smart phone, but it is not limited thereto. The user terminal 500 may be implemented as various types of devices having a display function such as a PC, a tablet PC, a PMP, or a PDA.

In some forms, in FIG. 1, the TV 110 also operates as a user terminal in additional to the user terminal 500 such that a user can provide input. By way of example, two different user terminals may be used to perform home shopping, place an order and complete an order process.

Figure 2:
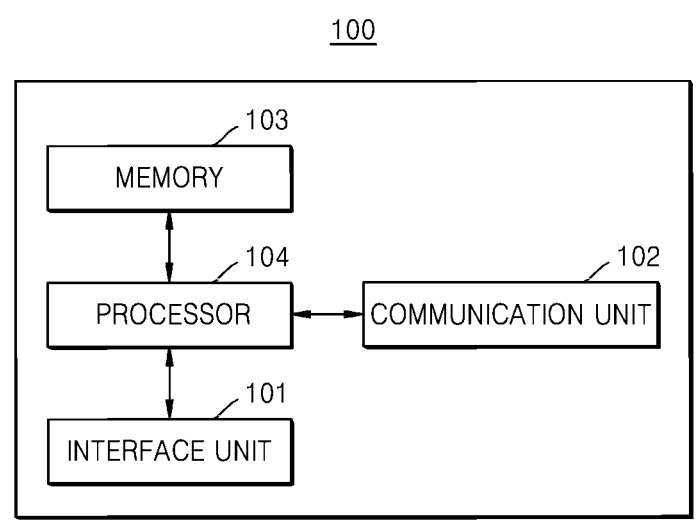
FIG. 2 is a block diagram for explaining the components of a set-top box according to an embodiment of the present disclosure.

FIG. 2 is a block diagram for explaining components of the set-top box 100 according to one or more embodiments of the present disclosure.

Referring to FIG. 2, the set-top box 100 may include an interface unit 101, a communication unit 102, a memory 103, and a processor 104.

The interface unit 101 may be an interface means with a remote control device (not shown) and/or the TV 110. In this case, the remote control device may include a device such as a remote controller. The interface unit 101 may receive a signal corresponding to a user input received through the remote control device and/or the TV 110.

As another example, the interface unit 101 may be an interface for connecting a separate user terminal and the set-top box 100. In addition, the interface unit 101 of the set-top box 100 may be a means for interfacing with a device in which input and output functions are integrated into one, such as a touch screen.

The communication unit 102 may provide a function for communicating through the network. The processor 104 may communicate with an external server or various external devices using the communication unit 102. For example, a request generated by the processor 104 of the set-top box 100 according to a program code stored in a recording device such as a memory 103 may be transmitted to the content providing server 200 through the network under the control of the communication unit 102. Conversely, signals, contents, files, etc. received from the content providing server 200 may be received by the set-top box 100 through the communication unit 102 via the network. For example, image information of the broadcaster server 400 and/or content information of the content providing server 200 may be received through the communication unit 102 and may be transmitted to the processor 104 or the memory 103. In other forms, contents or files may be stored as a storage medium. The set-top box 100 may further include such storage medium.

The communication unit 102 may be implemented to perform communication with various types of external devices according to various types of communication methods. The communication unit 102 may include at least one of a Wi-Fi chip, a Bluetooth chip, a wireless communication chip, or an NFC chip.

In some forms, the memory 103 is a computer-readable recording medium and may include a permanent mass storage device such as a random access memory (RAM), read only memory (ROM), and a disk drive. In addition, program codes and settings for controlling the content providing server 200, the broadcaster server 400, and the set-top box 100, and a broadcast image or content may be temporarily or permanently stored in the memory 103.

The processor 104 may be configured to process instructions of a computer program by performing basic arithmetic, logic, and input/output operations. Instructions may be provided to the processor 104 by the memory 103 or the communication unit 102. For example, the processor 104 may be configured to execute an instruction received according to a program code stored in a recording device such as the memory 103.

The processor 104 may be implemented as a digital signal processor (DSP) that processes digital signals, a microprocessor, or a time controller (TCON). However, the processor 310 is not limited thereto, and it may include one or more of a central processing unit (CPU), a microcontroller unit (MCU), a micro processing unit (MPU), a controller, an application processor (AP), a communication processor (CP), and an advanced RISC machine (ARM) processor, or may be defined in the corresponding term. In addition, the processor 104 may be implemented as a system on chip (SoC) or large scale integration (LSI) with a built-in processing algorithm, or may be implemented in the form of a field programmable gate array (FPGA).

The processor 104 may receive channel image information from the broadcaster server 400 through the communication unit 102, receive content information from the content providing server 200, transmit the channel image information and content information to the TV 110 through the communication unit 102, and transmit order request information and user information corresponding to a user input to the content providing server 200. A more detailed description will be given later in the related drawings.

Figure 3:
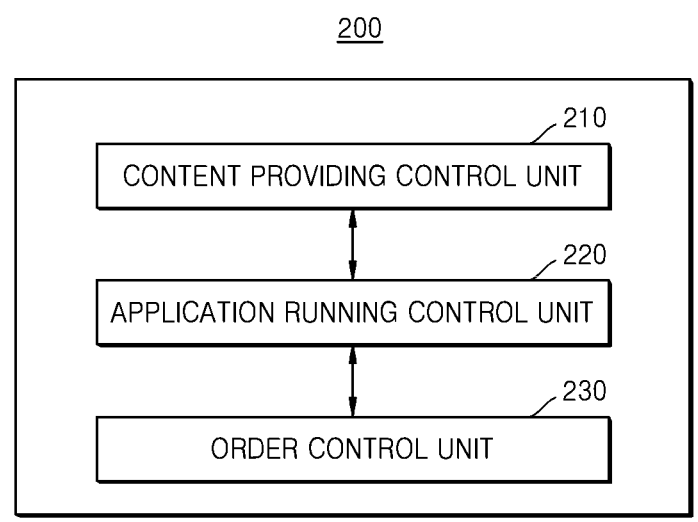
FIG. 3 is a block diagram illustrating the components of a content providing server according to an embodiment of the present disclosure.

FIG. 3 is a block diagram illustrating the components of the content providing server 200 according to one or more embodiments of the present disclosure.

Referring to FIG. 3, the content providing server 200 may include a content providing control unit 210, an application running control unit 220, and an order control unit 230.

The content providing control unit 210 may control to display content corresponding to the displayed channel of the TV 110 according to the user's control. For example, when a user inputs a channel selection through a remote controller while watching TV, such a selection input may be recognized, and a content image related to a channel corresponding to such a selection input may be displayed on the user's TV.

According to one or more embodiments of the present disclosure, when a channel corresponding to the channel image signal received from the broadcaster server 400 is selected and input, the content providing control unit 210 may control to display the content related to the selected channel on the TV 110 together.

The application running control unit 220 may control an application including one or more areas that are distinguished from the channel image, which is the content from the broadcaster server 400, to be run on the set-top box 100 or to be run on the TV 110 connected to the set-top box 100 through the set-top box 100. Such an application may operate simultaneously when an image, which is content from the broadcaster server 400, is displayed on the TV 110. For example, when an image set for a channel is displayed on the TV 110, the application may start to run simultaneously.

Additionally or alternatively, when an image set for a channel corresponding to the selection input is displayed on a TV through the application running control unit 220, the application may be operated at the same time. By way of example only, the application may start running at the same time when an image set for a channel is displayed on the TV 110.

Also, as another example, until the channel set according to the user's selection input is changed, control of information such as images and videos displayed on the TV 110 may be performed through the application driving control unit 220. By way of example only, the application running control unit 220 may control the screen of the TV 110 through control of an application including a TV image through a signal connection with the set-top box 100 connected to the TV 110.

The application driven by the TV 110 or the set-top box 100 through the application running control unit 220 may include various image information, and for example, include a menu bar form for inputting and reacting to the user's selection.

In addition, as an example, an application driven by the TV 110 or the set-top box 100 through the application driving control unit 220 may control to display a frame in a fixed image form on the TV in the form of an image for a certain period of time.

In addition, as an example, an application run by the TV 110 or the set-top box 100 through the application running control unit 220 may control to display one or more video information on the TV 110 screen, and as a specific example, control the set-top box 100 to display video information. Additionally or alternatively, when implementing such a video, the application driving control unit 220 may control a position in which the video is to be implemented among the entire screen area, and as an additional example, may control the position to be implemented in a frame area displayed as an application on the TV 110 screen.

As an example of operation, when a signal for video implementation is received through the application running control unit 220, the set-top box 100 selects a video corresponding to the signal from the stored video information or selects the address information of the video(URL) to be displayed on the TV 110 screen through the set-top box 100, and the set-top box 100 can receive the selected video from the broadcaster server 400, and at this time, displays the selected video information in the received position or frame area.

When a user selects an input area, for example, a menu bar or various selection buttons, through an application driven by the TV 110 or the set-top box 100 until the channel set according to the user's selection input is changed, this is transmitted to the application running control unit 220 through the set-top box 100 and the network. The application running control unit 220 may cause one or more videos corresponding to the user's selection to be implemented on the TV 110 connected to the set-top box 100. For example, a plurality of videos may be sequentially implemented, or a video may be changed or a new video may be started or terminated according to a user's selection.

The video information may include various types of information and may include shopping information. For example, shopping deal information may be included in video information. Additionally or alternatively, such video information may include TV home shopping video information, each including one item for TV home shopping.

A user may easily check a plurality of segments of video information, such as, shopping deal information, without changing a channel by selecting a channel on the TV 110 screen, and may easily view information on a plurality of TVs 110 home shopping channels.

While checking the image information transmitted through the broadcasting center through the TV 110 screen, at the same time, the user may check the image information, for example, various information segments on home shopping information, through an application implemented on the screen of the TV 110. For example, text information corresponding to the image information may be displayed together with the image on the TV 110 screen, thereby improving user convenience and ordering convenience.

In addition, according to the user's operation while the user is checking the image information transmitted through the broadcasting center, for example, according to the user's direction control of the remote controller or input of various selection buttons, the application running control unit 220 may selectively display various video information already produced, such as shopping deal video information, on the TV 110.

The application running control unit 220 may include a cloud control connection unit. Through this, the application driving screen may be easily displayed on the user's TV 110 screen in a cloud method, for example, a cloud streaming method. For example, the application running control unit 220 may include a media cloud server, and through such a media cloud server, the application may be implemented on the TV 110 screen as needed. Accordingly, the application, data, software, etc. necessary for running the application in the set-top box 100 or the TV 110 connected thereto may be reduced or not included.

Additionally or alternatively, when implementing an application using a cloud server, an application may be implemented by driving a spare cloud server and an application may be implemented by driving a main cloud server. When the user selects a channel and the image of the selected channel is displayed on the TV 110, it is possible to use a spare cloud server operation, and when there is user manipulation, for example, moving the focus or cursor on the screen, or inputting a selection through a remote controller, it is possible to use the main cloud server operation.

When an application is run by driving a spare cloud server, the same information may be displayed to a plurality of users accessing the channel, for example, thousands of users. In this case, essential information corresponding to image information, for example, real-time information data corresponding to image information such as real-time sales number and broadcast progress rate, pop-up data information, banner information linked to video, and the like, may be expressed. The spare cloud server may have various types, and may take the form of Broadcasting Cloud Streaming (BCS).

In a case where there is a user manipulation or selection, when the main cloud server is driven, each information according to the manipulation of each user may be displayed. The main cloud server may have various types, and may have a form of interactive cloud streaming (ICS), and one user may use each window (application) displayed through the cloud server.

By using these selected clouds, the efficiency of the cloud server is improved and the load on the cloud server is reduced, such that it is possible to smoothly run a complex application even when multiple users are using the cloud server through the channel selection at the same time. In addition, a minimum number of cloud server(s) is allocated to users who do not stay for a long time or change channels after selecting a channel so that cloud server management efficiency may be improved.

The order control unit 230 may be formed to control a user's order operation with respect to information displayed through the TV 110.

For a set image corresponding to the channel, or one or more additional videos to be displayed, the user may recognize a selection, for example, the user's input through the set-top box 100 and/or the TV 110 connected thereto, according to a running the application, and control the order operation by recognizing this input.

The image or one or more videos set as described above may include shopping deal information, and each of these shopping deal information has a corresponding source information. Such source information is stored in a specific server or storage unit, and may be connected to the application driving control unit 220 in real time or periodically.

When a user selects, for example, inputs an order to purchase a product included in a video, the order control unit 230 may recognize the input order. Such recognition may be performed through various UIs such as an order selection button displayed on the TV 110, and such display and recognition may be performed through the application running control unit 220.

When the input is performed, the order control unit 230 may determine exact item information that the user wants to order by using the source information corresponding to the shopping deal selected by the user to order, and initiate an order operation for this.

Additionally or alternatively, the order control unit 230 may control the connection of the content providing server 200 to the ARS server 300. For example, if a user is already subscribed, or if the user is already registered as a member or a phone number is registered, the order control unit 230 may control the connection with the ARS server 300 to match the ID information of the set-top box 100 together with the user to proceed with the order process through the ARS server 300.

Also, as another example, if a user is not registered as a member or a phone number is not registered, the order control unit 230 may transmit a control signal to the set-top box 100 to display an input window through which a user may input a phone number through a screen, and when receiving the user's phone number information, the order control unit 230 may recognize the receipt of the user's phone number and control the connection with the ARS server 300 to allow the user using the recognized phone to proceed with the order process through the ARS server 300. Additionally, if the user enters a phone number, the order control unit 230 may transmit a control signal to the set-top box 100 so that the set-top box 100 may perform an authentication operation. For example, after sending the authentication number, determining whether it is matched and then, receiving the authenticated number, the order control unit 230 may control the order process to proceed through connection with the ARS server 300.

In addition, as another example, the order control unit 230 may transmit a control signal to the set-top box 100 and display an order stage image area sequentially or at once to proceed with the order stage through the TV 100 screen. For example, the order control unit 230 may receive and recognize input contents through an address input window or payment information input window displayed on the TV 100 through the set-top box 100.

Additionally or alternatively, the order control unit 230 may determine order information including information on an order stage image authentication area in which the order stage has been performed, and then transmit the order information to the ARS server 300. The ARS 300 server may facilitate an order process through a telephone connection with a user.

In addition, as another example, the order control unit 230 may perform a personalized order operation using user information or the like when a user inputs an order. For example, if the user has already entered payment information, shipping information, etc. at the same time as the membership registration, this information may be stored together with the ID information in the set-top box 100, such as in a member management server (not shown) or in a storage unit. When the user's order information is entered using the stored information, even if the user does not enter payment information and delivery information each time, payment and delivery may be performed using the stored payment information and delivery information. Further description of each embodiment will be described later with reference to the related drawings.

Figure 4:
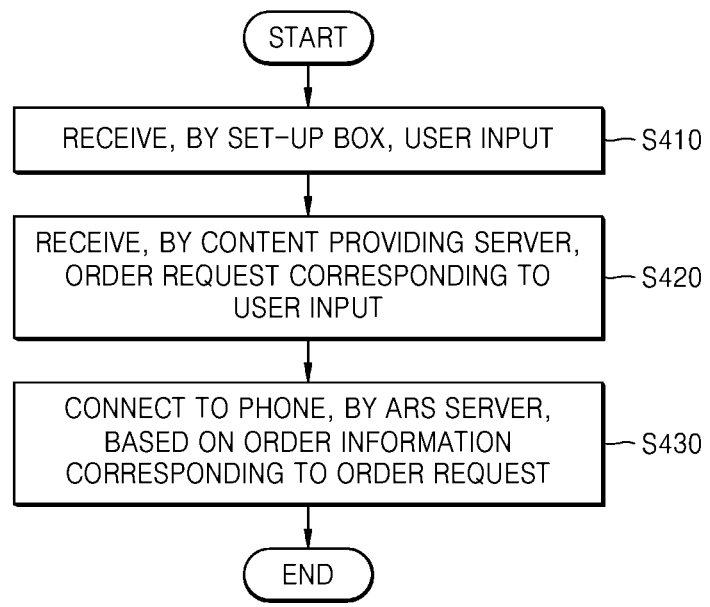
FIG. 4 is a simple flowchart illustrating a TV-based ordering method according to an embodiment of the present disclosure.

FIG. 4 is a flowchart illustrating a TV-based ordering method according to one or more embodiments of the present disclosure.

The set-top box 100 may receive a user input through the TV 110 (S410). In this case, the TV 110 may display a main channel image received in real time through the broadcaster server 400 and an application image received in real time through the content providing server 200 together.

Additionally or alternatively, the user may input a user command for selecting a UI included in an image displayed on the TV 110 through the remote control device. The TV 110 may transmit a signal corresponding to a user command to the set-top box 100. In this case, the user command may be an order request for ordering a product included in an image displayed on the TV 110.

The content providing server 200 may receive a signal corresponding to the order request from the set-top box 100 (S420).

The content providing server 200 may generate order information corresponding to the order request. The order information may include information on the amount of simultaneous viewing of the set-top box for the ordered product, inventory information on the ordered product, time stamp information on the order request time, product information related to the product, and user information. Further, the order information may include ID information of the set-top box 100, user payment information, user delivery information, user's past purchase history information, and user phone number, and may include image media information corresponding to the order request, promotion information on a product corresponding to the order request, and image layer information in which a user command corresponding to the order is input.

The content providing server 200 may transmit a user information request signal to the set-top box 100 when user information is not included in the order request. This will be described additionally.

The order request may be performed based on a user's interaction with an order image displayed on the TV 110. At this time, the order image may be a channel image included in a schedule or the like received through the broadcaster server 400, or may be an application image received through the content providing server 200. The ordered image may be an image in which a channel image and an application image are combined.

The content providing server 200 of the present disclosure may control the ARS server 300 to make a telephone connection to the user terminal 500 based on the order information (S430). Thereafter, the user may proceed with an additional process for placing an order of products through the user terminal 500.

Specifically, the content providing server 200 may transmit the first content information related to the order request to the ARS server 300. The ARS server 300 may identify an order image based on the corresponding first content information, and may perform an additional order process based on this. For example, the IVR system related to the ARS server 300 may recognize an order image (e.g., a main channel image, an application image, etc.) corresponding to the first content information, and proceed with the user's order consultation based on the recognized image.

In this case, the first content information may include all types of information corresponding to the order image. For example, the first content information may include information on the set-top box 100 in which the order image is displayed, image media information corresponding to the ordered image, promotion information for products corresponding to the order image, image layer information on which a user command is input, and the like.

In particular, the image medium information of the first content information may be information on whether the order image on which the order request is performed is a main channel image on a schedule provided by the broadcaster server 400 or an application image provided by the content providing server 200. That is, the TV-based ordering system 1 of the present disclosure may receive an order request as an order image as well as a pre-arranged broadcast image such as a main channel image in addition to application images such as Video On Demand (VOD) images, and the content providing server 200 may transmit information related to a corresponding order image to the ARS server 300 as the first content information.

Also, the image layer information of the first content information may be information on from which page (or layer) of the order image the corresponding product order is input.

According to the above-described embodiment, without additional interaction with the user through the ARS server 300, when placing an order, placing an order may be easier by identifying the order image being viewed.

The ARS server 300 may provide additional information to a user based on order information. In this case, the additional information may include inventory information of the ordered product, recommendation option information based on the purchase history information of the user, and the like, but it is not limited thereto.

Upon receiving an information request signal from the user terminal 500, in response thereto, the ARS server 300 may transmit the information request signal to the content providing server 200. The content providing server 200 may transmit second content information corresponding to the information request signal to the ARS server 300.

Thereafter, the ARS server 300 may receive and identify the corresponding second content information to perform an additional order process with the user. For example, the IVR system related to the ARS server 300 may recognize an image corresponding to the second content information, and may proceed with a user's order process.

Additionally or alternatively, the second content information may include all types of information additionally requested from the user terminal 500. For example, the second content information may include image information such as information on a product similar to an order product.

According to the above-described embodiment, the ARS server 300 processes an order while simultaneously identifying information corresponding to an interaction from a user, orders can be processed accurately and quickly.

FIGS. 5 to 7B are diagrams for explaining a TV-based ordering method according to an embodiment of the present disclosure.

Figure 5:
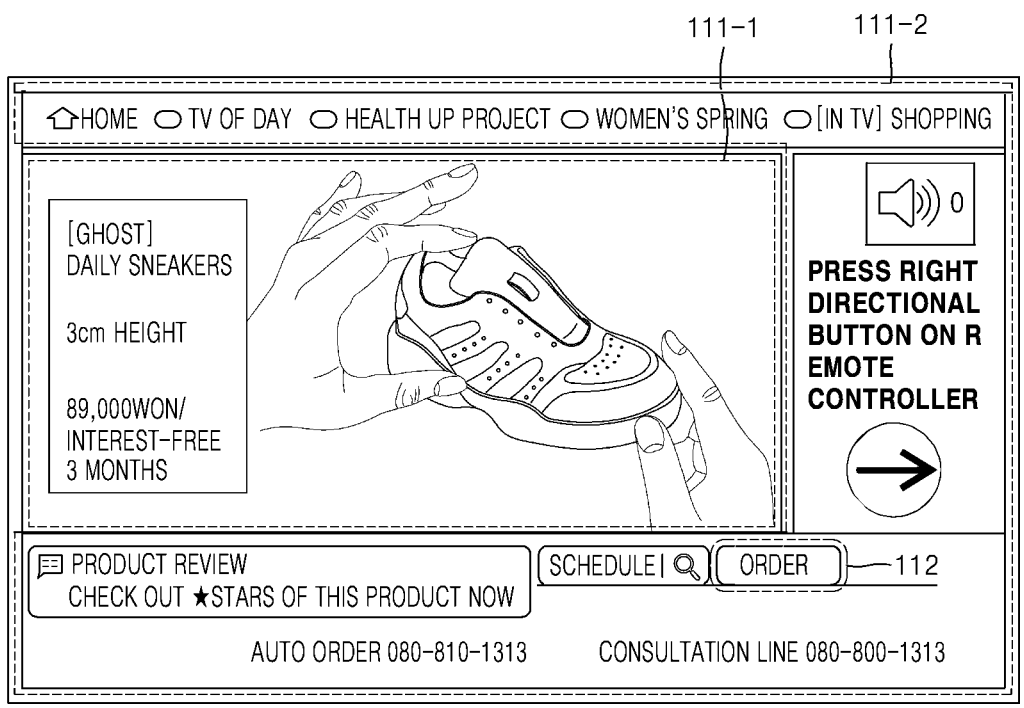

Referring to FIG. 5, the TV 110 according to one or more embodiments of the present disclosure may display one example of a main channel image corresponding to a user's selection.

An image corresponding to a user's channel selection, for example, a main channel image 111-1, may be displayed on the TV 110. In addition, the application is executed in the set-top box 100 that drives the user's TV screen, so that an application image 111-2 may be displayed together with the main channel image 111-1 on the TV 110. In this case, the application execution may the execution of a part or a processed form of the application, not the execution of the entire data, and this may be done using the content providing server 200.

Specifically, the set-top box 100 may receive information corresponding to the main channel image from the broadcaster server 400, and receive first content information corresponding to an application image from the content providing server 200. The set-top box 100 may control the display of the TV 110 screen based on information received by driving an application. That is, the main screen image 111-1 and the application image 111-2 may be displayed together on the screen of the TV 110, as shown in FIG. 5.

In some forms, the set-top box 100 may receive second content information from the content providing server 200, and the TV 110 may display a main channel image 111-1 from the broadcaster server 400 and an image corresponding to the second content information together.

In other forms, the set-top box 100 may control the TV 110 to display the order selection area 112 in the application image 111-2.

According to an embodiment of the present disclosure, a user viewing the TV 110 screen may select the order selection area 112 using a remote control device or the like. In FIG. 5, it is apparent that the order selection area 112 is shown to be disposed at the lower end of the main channel image 111-1, but may be disposed in a different area to increase intuitive convenience of the user.

When a user command for selecting the order selection area 112 is entered, the TV 100 and/or the set-top box 110 may transmit a signal corresponding to a user input to the content providing server 200, and a subsequent order process may proceed.

Figure 6A:
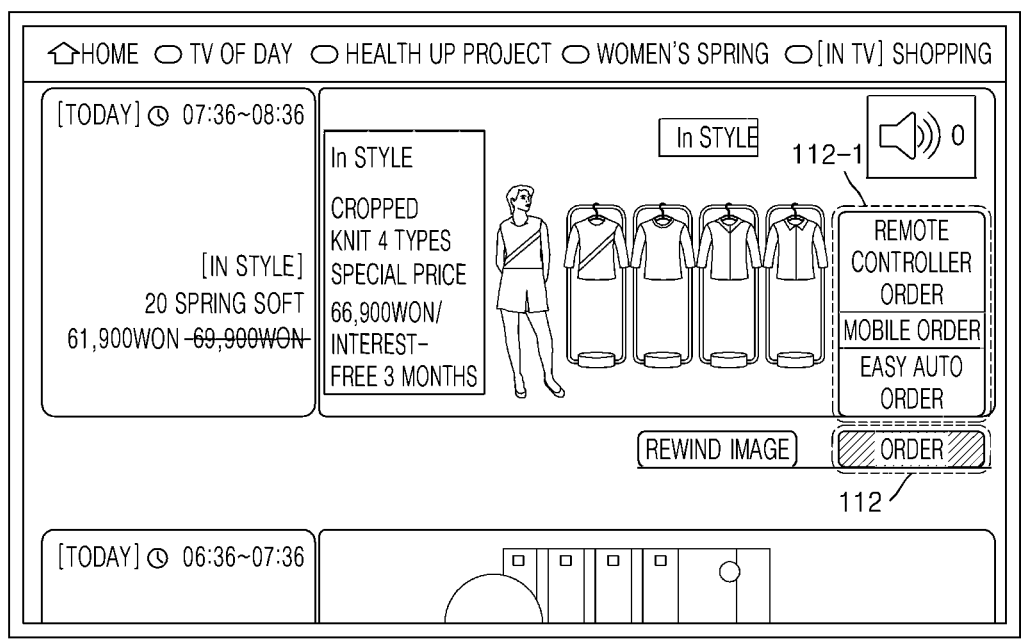
FIG. 6A illustrates a display of an additional optional area when a user command is input.
Figure 6B:
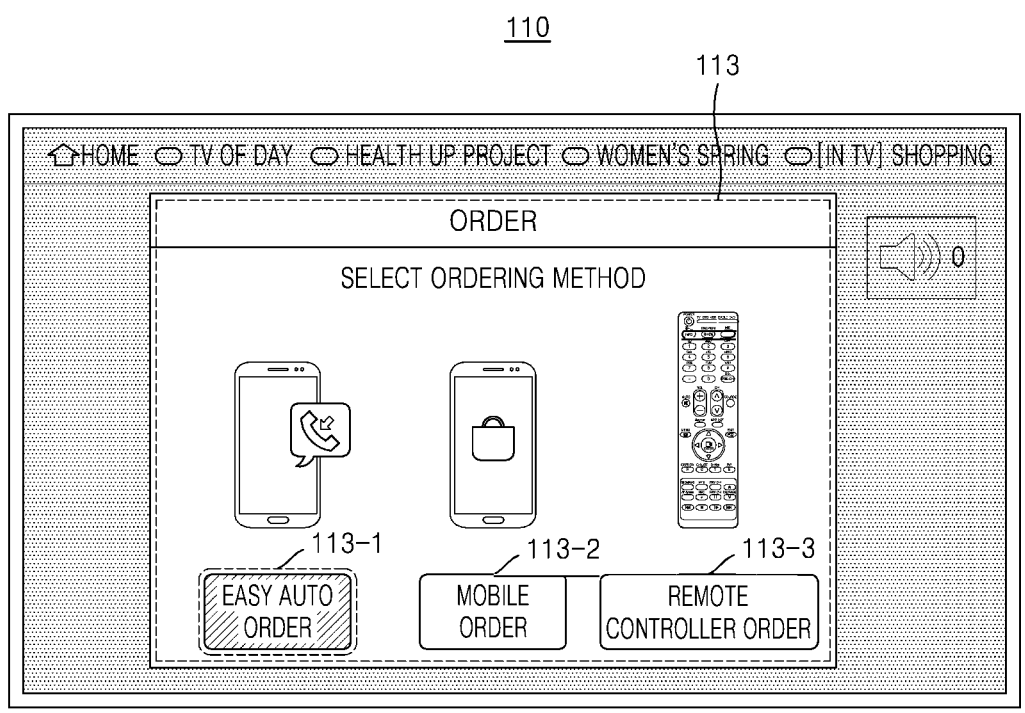
FIG. 6B illustrates a display of another additional optional area when a user command is input.

FIGS. 6A and 6B illustrate processes subsequent to selecting an order selection area according to an embodiment of the present disclosure.

Referring to FIG. 6A, when a user command for selecting the order selection area 112 is input, an additional option area 112-1 may be displayed. As an example, the additional option area 112-1 may include options of 'remote controller order', 'mobile order', and 'easy automatic order', but it is not limited thereto and may include various additional options.

According to an embodiment of the present disclosure, additional option area 112-1 may overlap as a separate layer (graphical user interface, GUI) from the screen layer where the main channel image 111-1 and the application image 111-2 are displayed and may be displayed. The additional option area layer may be displayed by overlapping a partial area on the application image 111-2 and the main channel image 111-1.

Referring to FIG. 6B, when a user command to select the order selection area 112 is entered, through a separate layer from the screen layer where the main channel image and application image are displayed, the additional option area 113 may be displayed on the entire screen. The additional option area 113 of the present embodiment may include the first GUI 113-1 through the third GUI 113-3, but this is only by way of example and may include various GUIs.

The user may select one option from the additional option area 112-1 through a remote control device or the like as shown in FIG. 6A. At this time, the set-top box 100 may execute an application to perform an operation corresponding to a corresponding option in response to a user input, and according to an example, the content providing server 200 may perform execution of all or part of the application.

Figure 7A:
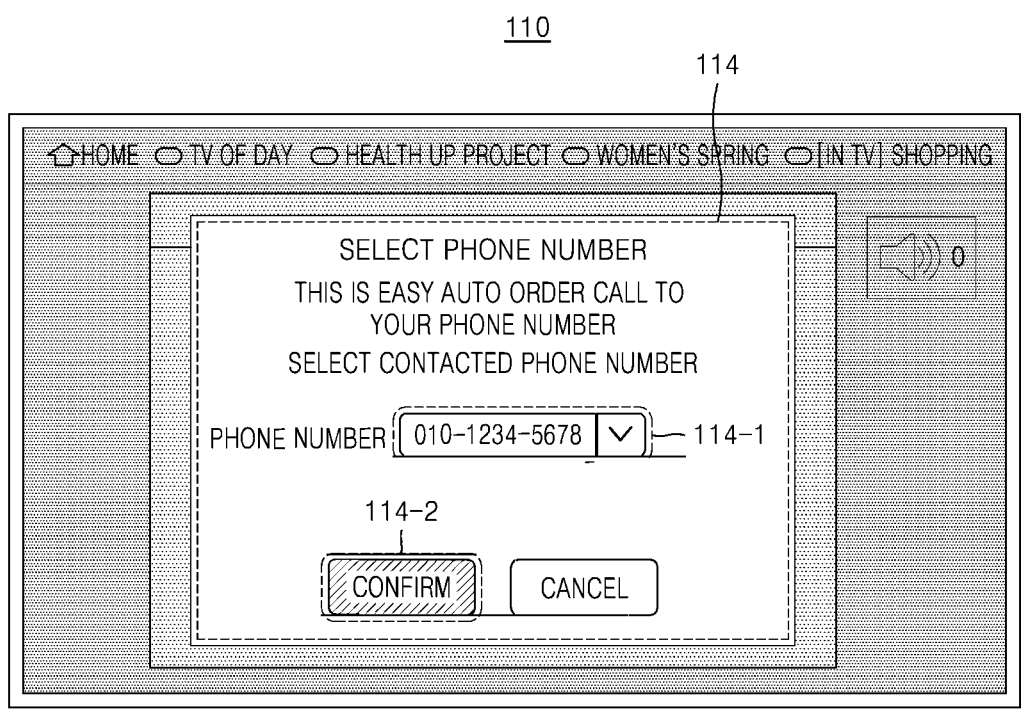
FIG. 7A illustrates a display of an order process after selecting 'easy automatic ordering option'.
Figure 7B:
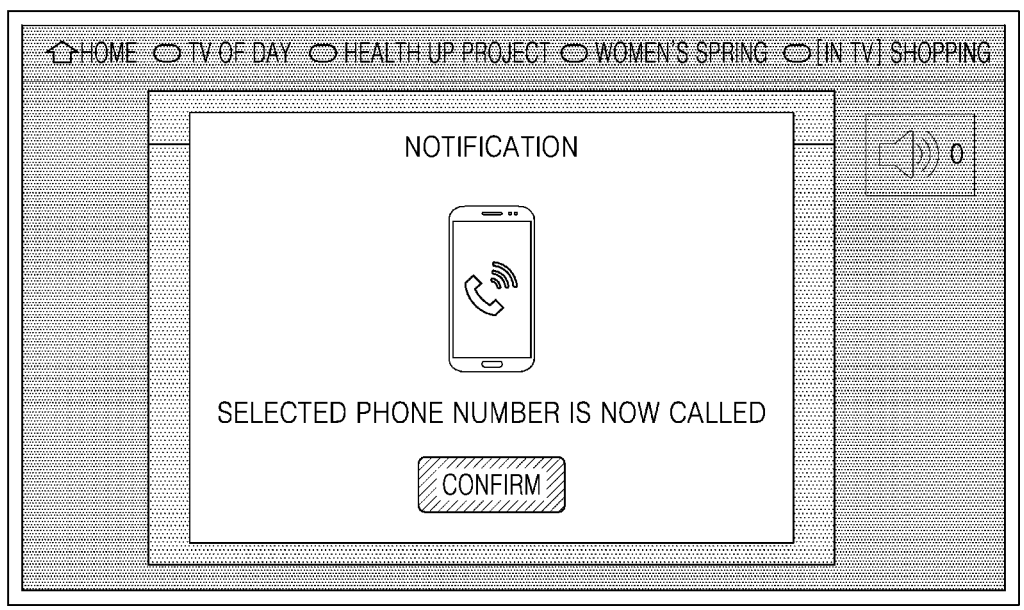

FIGS. 7A and 7B are diagrams for explaining an order process according to one or more embodiments of the present disclosure.

In particular, FIGS. 7A and 7B show exemplary screens displayed on the TV 110 for the order process after selecting the 'easy automatic ordering' option in FIGS. 6A and 6B.

Referring to FIG. 7A, the TV 110 may display an input area 114 for selecting a phone number in response to selection of an 'easy automatic order' option. The input area 114 may include a list of previously registered phone numbers 114-1, and the user may select a phone number of the user terminal 500 for placing an order telephonically using a remote control device or the like from the phone number list 114-1.

When there is a user input for selecting the confirmation selection GUI 114-2 after selecting the phone number of the user terminal 500 for a phone order, the TV 110 may display a guide screen as shown in FIG. 7B. Thereafter, the user terminal 500 (FIG. 1) may perform a subsequent ordering process through a telephone connection with the ARS server 300.

Specifically, if there is a user input to select the confirmation selection GUI 114-2, the set-top box 100 and/or the TV 110 may transmit an order request signal to the content providing server 200, and the content providing server 200 may control the ARS server 300 to make a telephone connection to the user terminal 500 based on the order request signal.

Figure 8A:
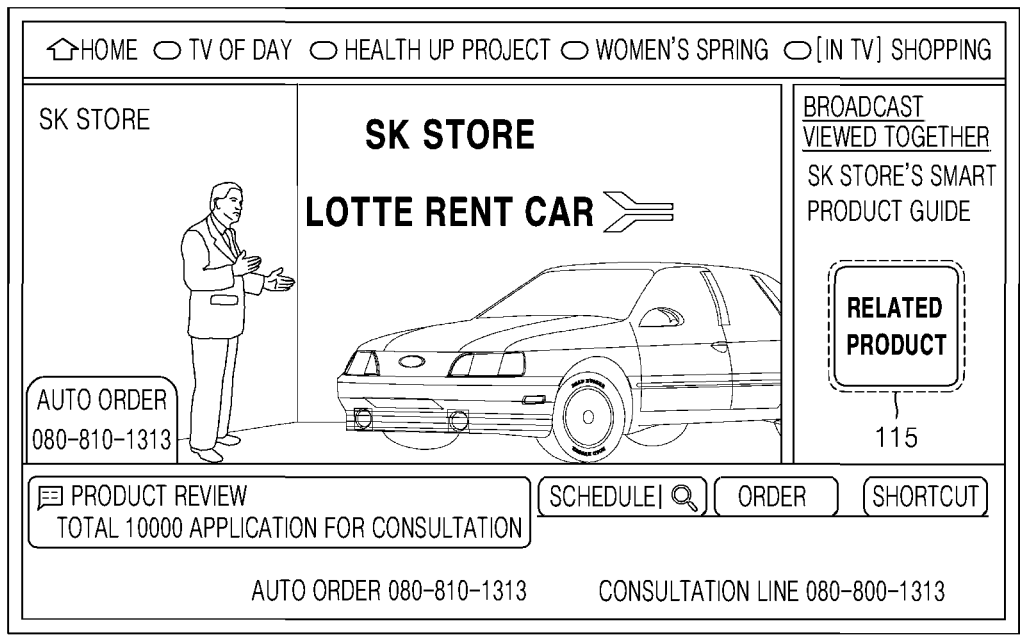
Figure 9:
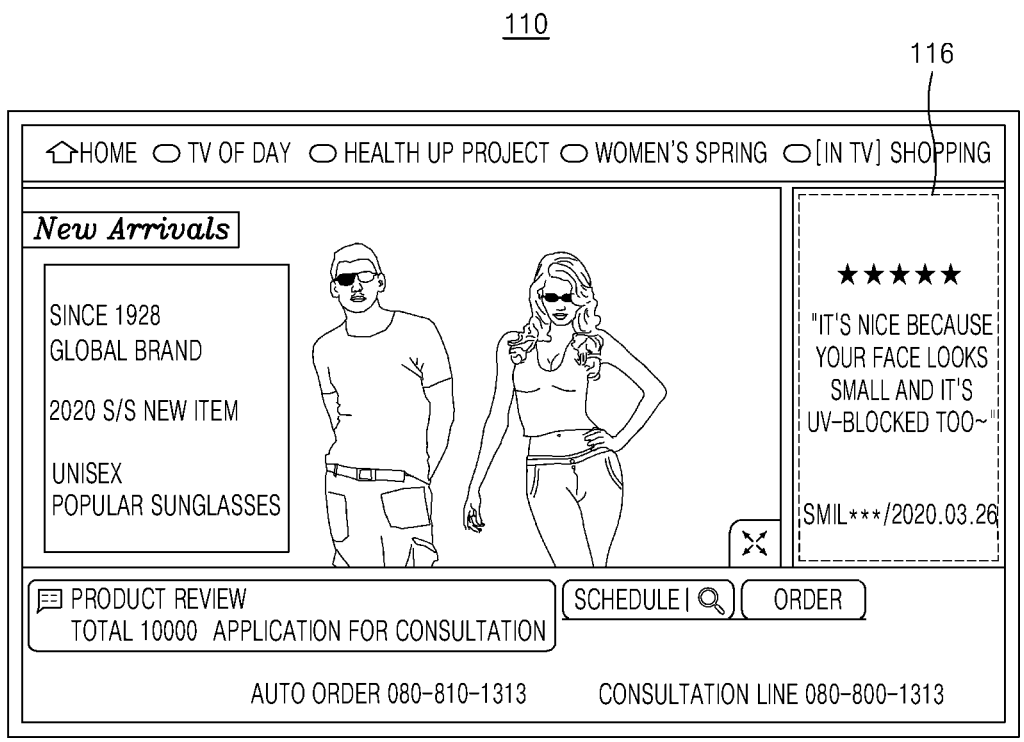

FIGS. 8A to 9 are diagrams for explaining processes of providing additional information in a subsequent order process according to one or more embodiments of the present disclosure.

Upon connection of a phone call is made between the user terminal 500 and the ARS server 300, the content providing server 200 may transmit the second content information to the set-top box 100 or the TV 110. However, this is only by way of example, and upon receiving the additional information request signal from the user terminal 500, the content providing server 200 may transmit the second content information to the set-top box 100 or directly the TV 110.

The TV 110 may display the related product GUI 115 based on the received second content information. For example, the related product GUI 115 may be displayed in a partial area of the application image 111-1.

Referring to FIG. 8B, when a user command for selecting the related product GUI 115 is input, the TV 110 may display an application image for guiding other products viewed within a preset time after other viewers have viewed the order product.

In some forms, the user of the user terminal 500 may perform a telephone connection with the ARS server 300 for order processing and at the same time acquire information on a product related to a corresponding product.

FIG. 9 illustrates another application image corresponding to second content information according to an embodiment of the present disclosure.

As shown in FIGS. 8A and 8B, the TV 110 or the set-top box 100 may receive second content information from the content providing server 200.

Referring to FIG. 9, the TV 110 may display a review image 116 for an order product based on the received second content information. In some forms, the review image 116 may overlap a separate layer (GUI) from a layer where an application image corresponding to the first content information is displayed and may be displayed.

However, this is only by way of example, and it is apparent that in other forms, the review image 116 corresponding to the second content information may be displayed overlapping with the main channel image, or may be displayed on the entire screen.

According to an embodiment of the present disclosure, the user of the user terminal 500 may perform a telephone connection with the ARS server 300 for order processing and at the same time acquire review information on a corresponding product.

Figure 10:
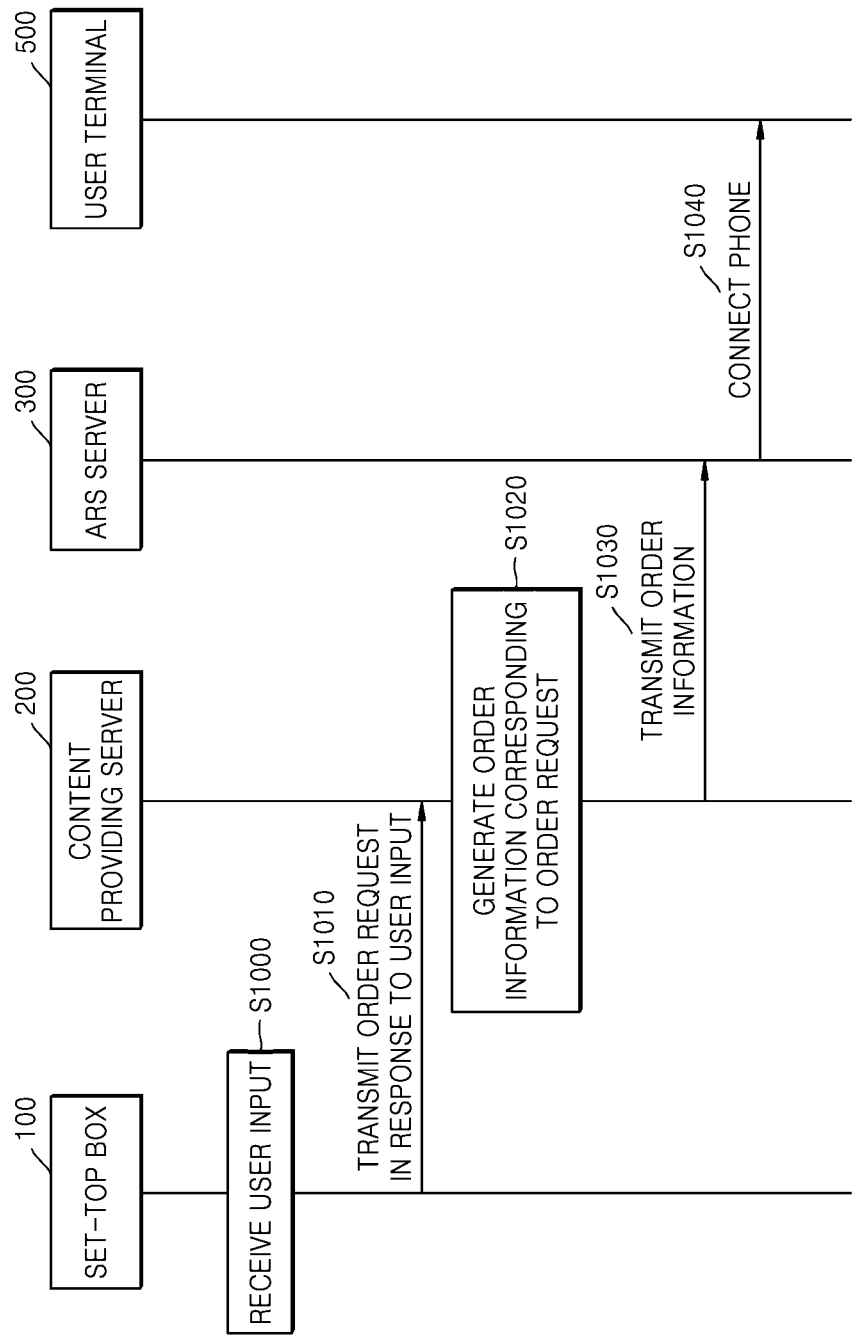
FIG. 10 is a simple sequence diagram illustrating a TV-based ordering system according to an embodiment of the present disclosure.

FIG. 10 is a sequence diagram illustrating a TV-based ordering system according to one or more embodiments of the present disclosure.

The set-top box 100 may receive a user input (S1000). In this case, the user input may be a user command input through the TV 110 connected to the set-top box 100. Specifically, the user input may be an input signal for ordering a product through an application image displayed on the TV 110. The set-top box 100 may transmit an order request for a corresponding product to the content providing server 200 in response to a user input (S1010).

The content providing server 200 may generate order information corresponding to an order request in response to a user input received from the set-top box 100 (S1020). In some forms, the order information may include information on the amount of simultaneous viewing of the set-top box for the ordered product, inventory information on the ordered product, time stamp information on the order request time, product information related to the product, and user information. Further, the order information may include ID information of the set-top box 100, user payment information, user delivery information, user's past purchase history information, and user phone number, but it is not limited thereto.

The content providing server 200 may transmit the generated order information to the ARS server 300 (S1030). In some forms, the ARS server 300 may perform a telephonic connection to the user terminal 500 based on the user phone number included in the order information (S1040).

Figure 11:
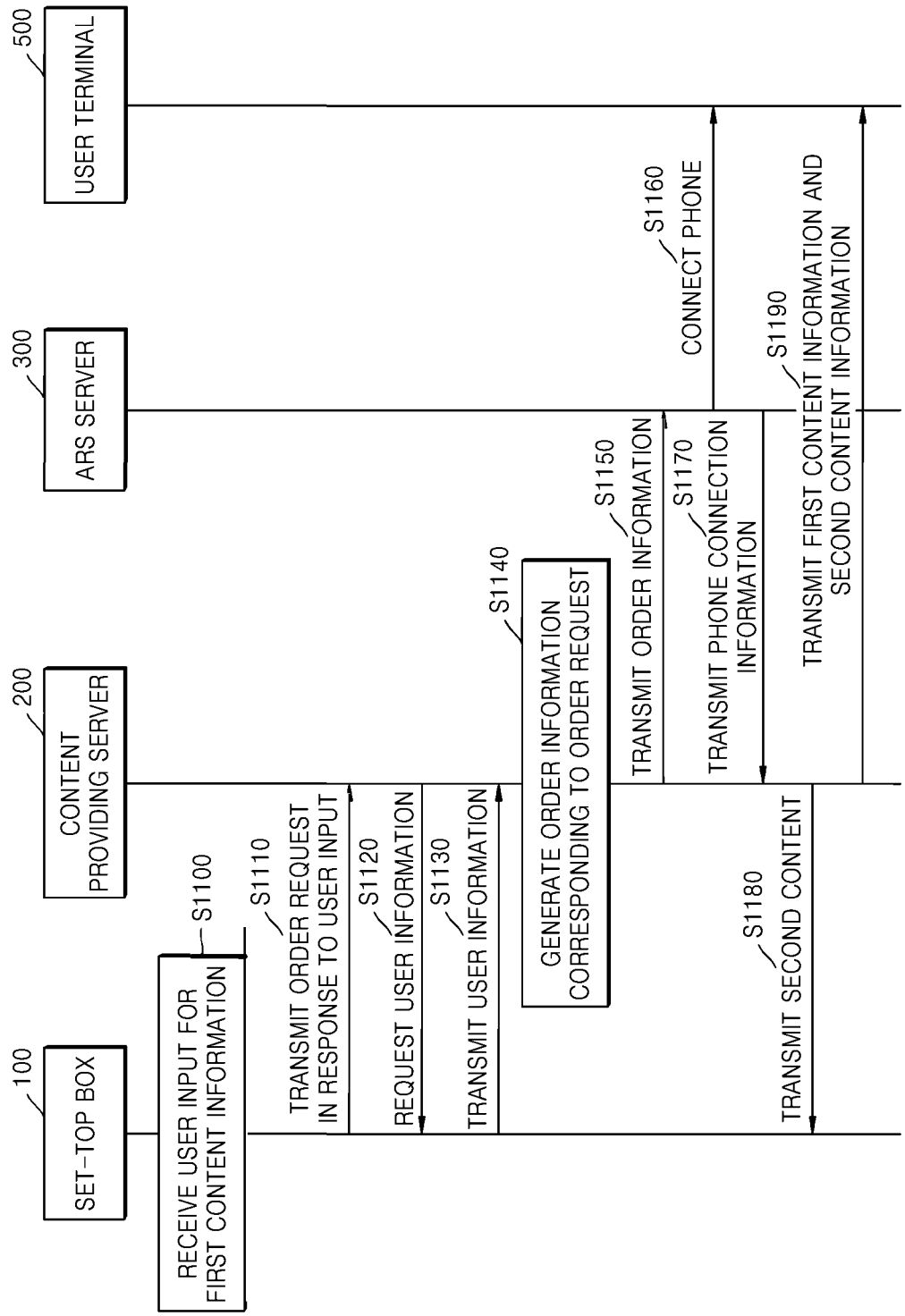
FIG. 11 is a detailed sequence diagram illustrating a TV-based ordering system according to an embodiment of the present disclosure.

FIG. 11 is a detailed sequence diagram illustrating a TV-based ordering system according to one or more embodiments of the present disclosure.

The set-top box 100 may receive a user input (S1100). In this case, the user input may be a user command input through the TV 110 connected to the set-top box 100. The user input may be an input signal for ordering a product through an order image (e.g., an application image) displayed on the TV 110. In this case, the application image may be an image corresponding to the first content information received from the content providing server 200 via the set-top box 100.

Additionally or alternatively, the set-top box 100 may receive an order input through a main channel image in addition to an application image. For example, it is apparent that the TV 110 may divide and display an application image and a main channel image on one screen, and the set-top box 100 may receive an order request for a product as an order image on the displayed screen.

The set-top box 100 may transmit an order request for a corresponding product to the content providing server 200 in response to a user input (S1110).

The content providing server 200 may identify the information included in the order request, and if it is determined that additional user information is required, request user information from the set-top box 100 (S1110). In this case, the user information may include ID information of the set-top box 100, user payment information, user delivery information, user's past purchase history information, and user phone number, and is not limited thereto.

According to an embodiment of the present disclosure, if the user responding to the order request is not registered as a member or the phone number is not registered, the content providing server 200 may transmit a user information request signal to the set-top box 100 so that an input window through which a user may input a phone number is displayed on the TV 110.

Additionally, if the user enters a phone number, the content providing server 200 may transmit a control signal to the set-top box 100 so that the set-top box 100 may perform an authentication operation. The user may input user information on the screen displayed on the TV 110, and for example, the set-top box 100 may transmit the authentication number, determine whether to match or not, receive the authenticated number, and transmit the input information to the content providing server 200 (S1130).

The content providing server 200 may generate order information corresponding to an order request in response to a user input received from the set-top box 100 (S1040). In this case, the order information may include information on the amount of simultaneous viewing of the set-top box for the ordered product, inventory information on the ordered product, time stamp information on the order request time, product information related to the product, and user information, but it is not limited thereto.

The content providing server 200 may transmit the generated order information to the ARS server 300 (S1050). The ARS server 300 may perform a telephonic connection to the user terminal 500 based on the user phone number included in the order information (S1160).

According to an optional embodiment, the content providing server 200 may transmit the first content information to the ARS server 300 in addition to the order information. In this case, since the first content information has already been described above, detailed information will be omitted. When the telephonic connection with the user terminal 500 is provided, the ARS server 300 may identify the order information and the first content information and quickly perform an order process based on the order information.

When the telephonic connection with the user terminal 500 is provided, the ARS server 300 may transmit connection information indicating that the phone has been connected to the content providing server 200 (S1170).

Upon receiving the connection information, the content providing server 200 may transmit the second content information to the set-top box 100 (S1180), and transmit the first content information and the second content information to the user terminal 500 (S1190).

In this case, the second content information may correspond to information related to a product corresponding to the first content information. For example, the second content information may be for an application image including similar product information of the product corresponding to the main channel image and the first content information, review information for the product, and the like, but it is not limited thereto. Since the content of the second content information has already been described above, detailed information will be omitted.

Meanwhile, steps S1180 and S1190 may be performed separately from whether or not the telephonic connection information is received. According to an embodiment of the present disclosure, steps S1180 and S1190 may be executed when a request for additional information is received.

For example, when a user of the user terminal 500 requests additional information from the ARS server 300, the ARS server 300 may transmit an additional information request signal to the content providing server 200. As another example, the user terminal 500 may be directly connected to the content providing server 200 and transmit an additional information request signal to the content providing server 200. That is, the content providing server 200 may transmit the second content to the set-top box 100 and the ARS server 300 according to a user's request for additional information.

According to the above, the user may place an order with the ARS server 300 through the user terminal 500 and view additional information corresponding to the second content information through the TV 110 substantially at the same time.

That is, when the ARS server 300 is connected to the user terminal 500 by phone, the ARS server 300 may be able to process an order while identifying and confirming the order information, the first content information, and the second content information substantially in real time.

The system described in the above embodiments may be implemented as a hardware component, a software component, and/or a combination of a hardware component and a software component. For example, the devices and components described in the embodiments may be implemented using one or more general purpose computers or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executed on the OS. In addition, the processing device may access, store, operate, process, and generate data in response to the execution of software. For the convenience of understanding, in some cases, one processing device is described as being used, but those of ordinary skill in the art will appreciate that the processing device may include a plurality of processing elements and/or multiple types of processing elements. For example, the processing device may include a plurality of processors or one processor and one controller. In addition, other processing configurations are possible, such as a parallel processor.

The software may include a computer program, code, instruction, or a combination of one or more of these, and may configure the processing device to operate as desired, or may command the processing device independently or collectively. In order to be interpreted by the processing device or to provide commands or data to the processing device, software and/or data may be permanently or temporarily embodied in any type of machine, component, physical device, virtual equipment, computer storage medium or device, or signal wave to be transmitted. The software may be distributed over networked computer systems and stored or executed in a distributed manner. Software and data may be stored on one or more computer-readable recording media.

The method according to the embodiment may be implemented in the form of program instructions that may be executed through various computer means and recorded in a computer-readable medium. The computer-readable medium may include program instructions, data files, data structures, etc. alone or in combination. The program instructions recorded in the medium may be specially designed and configured for embodiments, or may be known and usable to those skilled in computer software. Examples of computer-readable recording media include hardware devices specially configured to store and execute program instructions, for example, magnetic media such as hard disks, floppy disks and magnetic tapes, optical media such as CD-ROM and DVD, magneto-optical media such as a floptical disk, and ROM, RAM, flash memory, etc. Examples of the program instructions include not only machine language codes such as those produced by a compiler, but also high-level language codes that may be executed by a computer using an interpreter or the like. The above-described hardware device may be configured to operate as one or more software modules to perform the operation of an embodiment, and vice versa.

The TV-based ordering system according to an embodiment of the present disclosure may provide various information to a user through a distributed information processing load.

Through the TV-based ordering system according to an embodiment of the present disclosure, for commerce contents serviced in the form of VOD, customers may easily order products of commerce contents being viewed, and furthermore, it is possible to increase customer convenience and reliability, and realize service support suitable for various platforms of IPTV service.

Furthermore, a user according to an embodiment of the present disclosure may view additional information on an ordered product while proceeding with an order through the ARS. Likewise, the ARS counselor has the effect of being able to place an order while checking information on the screen the user is watching in real time.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A TV-based ordering system, comprising:
  a content providing server in communication with a plurality of set-top boxes and a broadcaster server via a network, the content providing server further configured to:
    transmit address information of a main channel image to the plurality of set-top boxes,
    control the plurality of set-top boxes including a selected set-top box to:
      receive the main channel image using the address information directly from the broadcaster server; and display the main channel image received from the broadcaster server and a first application image on a plurality of TVs coupled to the plurality of set-top boxes; and
receive a user input which is an order request for a product corresponding to the main channel image and the first application image at the selected set-top box; and
generate order information in response to the order request, the order information including information on a number of simultaneous viewing of the plurality of set-top boxes for an ordered product, user payment information, and user delivery information; and
an ARS server in communication with the content providing server and configured to:
receive the order information from the content providing server; and
connect to a user terminal in response to the order information;
wherein the ARS server is further configured to identify the order request as an order image including the main channel image and the first application image that a user is viewing at the time when the user input is received at the selected set-top box, based on at least the first content information; and
wherein the first content information is related to the order request by including selected set-top box information, image medium information indicative of whether the order request is performed on the main channel image or the first application image, and image layer information indicative of from which page or layer of the order image the order request for the product is input.

2. The TV-based ordering system of claim 1,
wherein the content providing server:
obtains product information related to the first application image and user information associated with the selected set-top box based on the order request, and
generates the order information based on the obtained information,
wherein the ARS server connects to the user terminal based on the order information.

3. The TV-based ordering system of claim 1, wherein:
the ARS server is further configured to telephonically connect to the user terminal; and
upon receiving phone connection information from the ARS server:
the content providing server transmits:
second content information to a TV connected to the selected set-top box; and
the first content information and the second content information to the ARS server;
the second content information related to additional information requested from the user terminal subsequent to the order request; and
wherein the content providing server controls the TV to display a second application image corresponding to the second content information.

4. A TV-based ordering method using a set-top box connected to a TV, comprising:
communicating at a content providing server with a broadcaster server via a network;
transmitting address information of a main channel image to a target set-top box;
controlling the target set-top box to:
receive the main channel image using the address information directly from the broadcaster server,
receive first content information from the content providing server, and
display the main channel image and a first application image corresponding to the first content information received from the content providing server on a TV coupled to the target set-top box;
receiving, by the content providing server, a user input which is an order request corresponding to the main channel image and the first application image from the target set-top box connected to the TV;
generating, by the content providing server, order information in response to the order request, the order information including information on a number of simultaneous viewing of a plurality of set-top boxes for the ordered product, user payment information, and user delivery information; and
receiving, by an ARS server, the order information corresponding to the order request from the content providing server;
connecting to a user terminal in response to the order information;
generating, at the content providing server, the first content information related to the order request from a user terminal; and
identifying, with the ARS server, the order request as an order image including the main channel image and the first application image that a user is viewing at the time when the user input is received at the target set-top box based on at least the first content information,
wherein the first content information is related to the order request by including selected set-top box information, image medium information indicative of whether the order request is performed on the main channel image or the first application image, and image layer information indicative of from which page or layer of the order image the order request for the product is input.

5. The method of claim 4, further comprising:
obtaining, by the content providing server, product information related to the first application image and user information related to the set-top box by using the order request;
generating the order information based on the obtained information; and
telephonically connecting, by the ARS server, to the user terminal based on the order information.

6. The method of claim 4, further comprising:
receiving phone connection information from the ARS server;
transmitting, by the content providing server, second content information to the TV coupled to the target set-top box, the second content information related to additional requests from the user terminal subsequent to the order request;
transmitting the first content information and the second content information to the ARS server; and
controlling, by the content providing server, the TV to display a second application image corresponding to the second content information.

7. A non-transitory tangible computer-readable recording medium on which a program for performing the method of claim 4 is recorded.

8. A TV-based ordering method using a set-top box, comprising:
communicating at a content providing server with a broadcaster server via a network;
transmitting an address information of a main channel image to a target set-top box;

generating, at the content providing server, first content information;

controlling the target set-top box to:
- receive the main channel image using the address information directly from the broadcaster server,
- receive the first content information from the content providing server, and
- display the main channel image received from the broadcaster server and a first application image corresponding to the first content information received from the content providing server, receiving, at the content providing server, a user input which is an order request corresponding to the main channel image and the first application image from the target set-top box connected to the TV;

wherein the first content information is related to the order request on the TV coupled to the target set-top box;

generating, at the content providing server, order information corresponding to the order request and transmitting the order information to an ARS server, the order information including having information on a number of simultaneous viewing of the set-top box for the ordered product, user payment information, and user delivery information;

receiving, at the ARS server, the order information;

connecting, with the ARS server, to a user terminal in response to the order information; and identifying, with the ARS server, the order request as an order image including the main channel image and the first application image that a user is viewing at the time when the user input is received at the target set-top box based on at least first content information, wherein the first content information is related to the order request by including selected set-top box information, image medium information indicative of whether the order request is performed on the main channel image or the first application image, and image layer information indicative of from which page or layer of the order image the order request for the product is input.

9. The method of claim 8, further comprising:
generating, at the content providing server, second content information related to additional request from the user terminal subsequent to the order request.

10. The method of claim 9, further comprising:
transmitting the second content information to the TV; and
transmitting the first content information and the second content information to the user terminal.

11. The method of claim 9, further comprising:
requesting from the content providing server user information to the user terminal; and
receiving at the content providing server the requested user information.

12. The method of claim 9, wherein connecting to the user terminal further comprises telephonically connecting to the user terminal; and
the method further comprising receiving, at the content providing server, phone connection information from the ARS server.

13. The method of claim 8, further comprising:
displaying on the TV, an image corresponding to a user's channel selection, the first application image generated by and received from the content providing server, or both.

14. The method of claim 13, further comprising:
displaying on the TV, an additional application image generated by and received from the content providing server, together with the image corresponding to the user's channel selection.

15. The method of claim 13, further comprising:
upon receipt of a user command indicative of an order selection, displaying a plurality of ordering options on a first user terminal including an automatic ordering; and
in response to selection of the automatic ordering, requesting and receiving user information at the content providing server; and
telephonically connecting with the ARS server to the user terminal.

16. The method of claim 15, further comprising:
upon connection between the user terminal and the ARS server, transmitting, at the content providing server, additional content to the TV, the user terminal, or both; and
controlling, by the content providing server, the TV to display the additional content.

* * * * *